United States Patent [19]
Klein et al.

[11] Patent Number: 5,348,110
[45] Date of Patent: Sep. 20, 1994

[54] DEVICE FOR ACTUATING THE CONTROL VALVE OF A HYDRAULIC POWER STEERING SYSTEM

[76] Inventors: Hans-Christof Klein, Hofhimer Strasse 22, 6234 Hattersheim; Manfred Kahrs, Auf der Ahl 93, 6200 Wiesbaden; Peter Drott, Am Kunzengarten 43, 6230 Frankfurt am Main; Wilhelm Beer, Merowinger Ring 23, 6090 Ruesselsheim 7; Joachim Baier, Dahlienweg 4 - 6, 6450 Hanau 8; Peter Kraft, Im Nesselbornfeld 49, 6380 Bad Homberg; Andreas Lang, Liebknechtstrasse 2, 6072 Dreieich, all of Fed. Rep. of Germany

[21] Appl. No.: 849,048

[22] PCT Filed: Jun. 6, 1991

[86] PCT No.: PCT/EP91/01041
§ 371 Date: Apr. 23, 1992
§ 102(e) Date: Apr. 23, 1992

[87] PCT Pub. No.: WO92/03325
PCT Pub. Date: Mar. 5, 1992

[30] Foreign Application Priority Data

Aug. 25, 1990 [DE] Fed. Rep. of Germany ....... 4026983
Nov. 5, 1990 [DE] Fed. Rep. of Germany ....... 4035065

[51] Int. Cl.⁵ ............................................. B62D 5/09
[52] U.S. Cl. .................... 180/132; 180/141; 180/142
[58] Field of Search ............... 180/132, 141, 142, 148, 180/79.1

[56] References Cited

U.S. PATENT DOCUMENTS

| | | | |
|---|---|---|---|
| 4,003,446 | 1/1977 | Fleury | 180/132 |
| 4,607,717 | 8/1986 | Nakayama | 180/141 |
| 4,856,608 | 8/1989 | Adams | 180/79.1 |

*Primary Examiner*—Mitchell J. Hill
*Attorney, Agent, or Firm*—J. Gordon Lewis; Robert P. Seitter

[57] ABSTRACT

A device for actuating the control valve (14) of a hydraulic power steering system for automotive vehicles, the rotary motion of a steering wheel being transmitted by means of a steering shaft (2) and the steering torque being transmitted by a relative rotation between the steering shaft (2) and a pinion shaft (4), and wherein the control valve (14) is a linear slide valve. A sleeve (6) embracing the steering shaft (2) and the pinion shaft (4) converts the relative rotation between the two shafts into an axial displacement axially and helically extending coulisse-type guides (7, 8), angularly disposed to one another, within which pins (9, 10), rigidly coupled to the steering shaft (2) and the pinion shaft (4), are received.

19 Claims, 5 Drawing Sheets

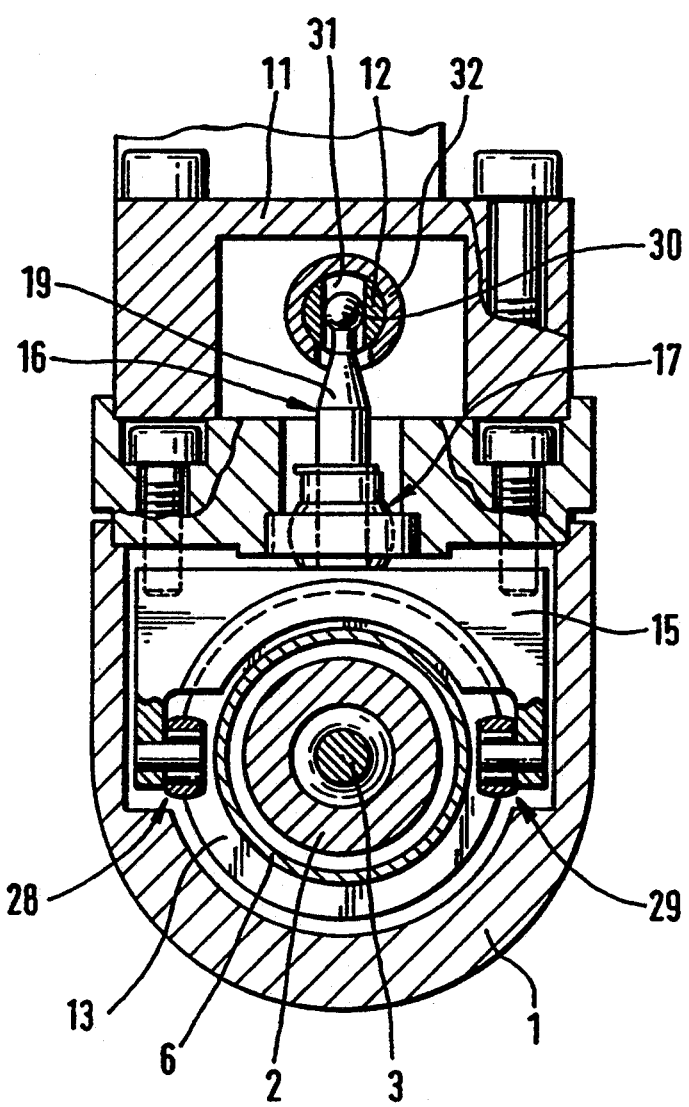

DEVICE FOR ACTUATING THE CONTROL VALVE OF A HYDRAULIC POWER STEERING SYSTEM

FIELD OF THE INVENTION

The present invention relates to a device for actuating the control valve of a hydraulic power steering system for automotive vehicles, the rotary motion of a steering wheel being transmitted by means of a steering shaft, and the steering torque being transmitted by a relative rotation between the steering shaft and a pinion shaft, and wherein the control valve is a linear slide valve.

BACKGROUND OF THE INVENTION

A device of this type is known from European patent application 0 362 592 wherein a portion of the steering shaft is of bell-type design and the shaft is axially slidably supported. The rotation of the two shafts relative to one another is converted into an axial movement and is transmitted to the control valve by means of pins in the pinion shaft and coulisse-type guides in the bell-type portion of the steering shaft. Because the steering shaft displaces axially in this arrangement, a sophisticated and expensive coupling between the steering wheel and the steering shaft is required to prevent axial displacement of the steering shaft.

SUMMARY OF THE INVENTION

It is, therefore, an object of the present invention to provide a structurally simple device for actuating the control valve which is composed of a small number of component parts and overcomes the known shortcomings.

This object is achieved in that there is provided a sleeve embracing the steering shaft and the pinion shaft which converts the relative rotation between the steering shaft and the pinion shaft into an axial displacement. In a preferred embodiment of the present invention, the sleeve comprises one pair of coulisse-type guides extending axially of the sleeve and one pair of coulisse-type guides extending helically of the sleeve. Pins which are rigidly coupled to the steering shaft and the pinion shaft, respectively, are received in the axially extending coulisse-type guides and the helically extending coulisse-type guides.

A particularly compact design results when the control valve is arranged directly beside the sleeve and the axial displacement is transmitted from the sleeve directly onto the control valve slide through an entraining means on the valve slide, which engages a circumferential groove on the sleeve.

In another embodiment of the invention which is preferred if it is not possible for space reasons to arrange the control valve and sleeve adjacent one another, a double lever is provided for transmitting the axial displacement from the sleeve onto the control valve. One end, a forked end, of the lever engages a circumferential groove of the sleeve, while its other end is attached to the valve slide so as to be rotatable, and the lever is supported so that it is axially immovable yet rotatably movable about a mid-point between the two ends. The position of the mid-point of rotation serves also to adjust the transmission ratio or the reduction ratio of the entire axial displacement.

A preferred embodiment of this invention provides that the lever is pivotably mounted in a housing receiving the control valve or in a part rigidly connected with the valve slide.

In order to compensate for all actuation clearances in the activation of valves, lever and sleeve, it is proposed further that a spring acting upon the valve slide applies a bias thereon. This results in a considerable reduction in hysteresis. Furthermore, the clearances and tolerances can be chosen to be augmented in a size whereby the manufacturing costs are curtailed.

According to another embodiment of this invention, the spring is supported on the valve slide by a sleeve-shaped part which is attached to the valve slide and embraces in particular the end area of the valve slide and support for the spring on the side opposite to the valve slide is provided by a closure element which closes the bore accommodating the spring.

In a particularly suitable embodiment of the present invention, the support of the lever is a spherical joint bearing.

According to another preferred embodiment of this invention, the portion of the lever making catch at the sleeve is of U-shaped design. By this particularly simple arrangement, tumbler movement of the sleeve which can possibly take place is no longer transmitted onto the valve.

Owing to a biassed leg spring being arranged in a recess of the pinion shaft so that the latter will twist in relation to the steering shaft only after the biassing force is overcome, it is ensured that the steering power aid will commence only in excess of a response threshold. Slight or weak steering maneuvers, frequently inadvertent, will hence not be boosted.

According to another embodiment of the present invention, in which the pins engage by means of resilient clamps almost without clearance or by means of roller bearings into the coulisse-type guides, the friction is reduced and a minimum of hysteresis of the valve travel as a function of the steering torque is ensured. For reduction in friction, the resilient clamp is preferably made of any bearing material, e.g. bearing bronze.

According to another embodiment of the present invention, entraining means on the control valve slide or, respectively, the double lever, is guided in axial direction such as to not allow being entrained by the rotational movement of the sleeve. This measure safeguards that the control valve is actuated devoid of transverse forces.

The losses due to friction and the hysteresis will be reduced further when the entraining means or, respectively, the double lever, is seated in a spherical joint relative to the sleeve. For a simple and functionally reliable coupling of the portion of the lever making catch at the valve slide with this latter component part, a suitable improvement of this invention provides that the portion of the lever making catch at the valve slide comprises a spherical element which engages into a guide extending transversely to the longitudinal axis of the valve element.

Possible embodiments of this invention as well as their advantages will be described below with reference to the accompanying drawings.

BRIEF DESCRIPTION OF THE DRAWINGS

FIG. 8 is a cross-section through the steering gear of FIG. 7 taken along the line A—A.

DETAILED DESCRIPTION OF THE INVENTION

Figure 1:
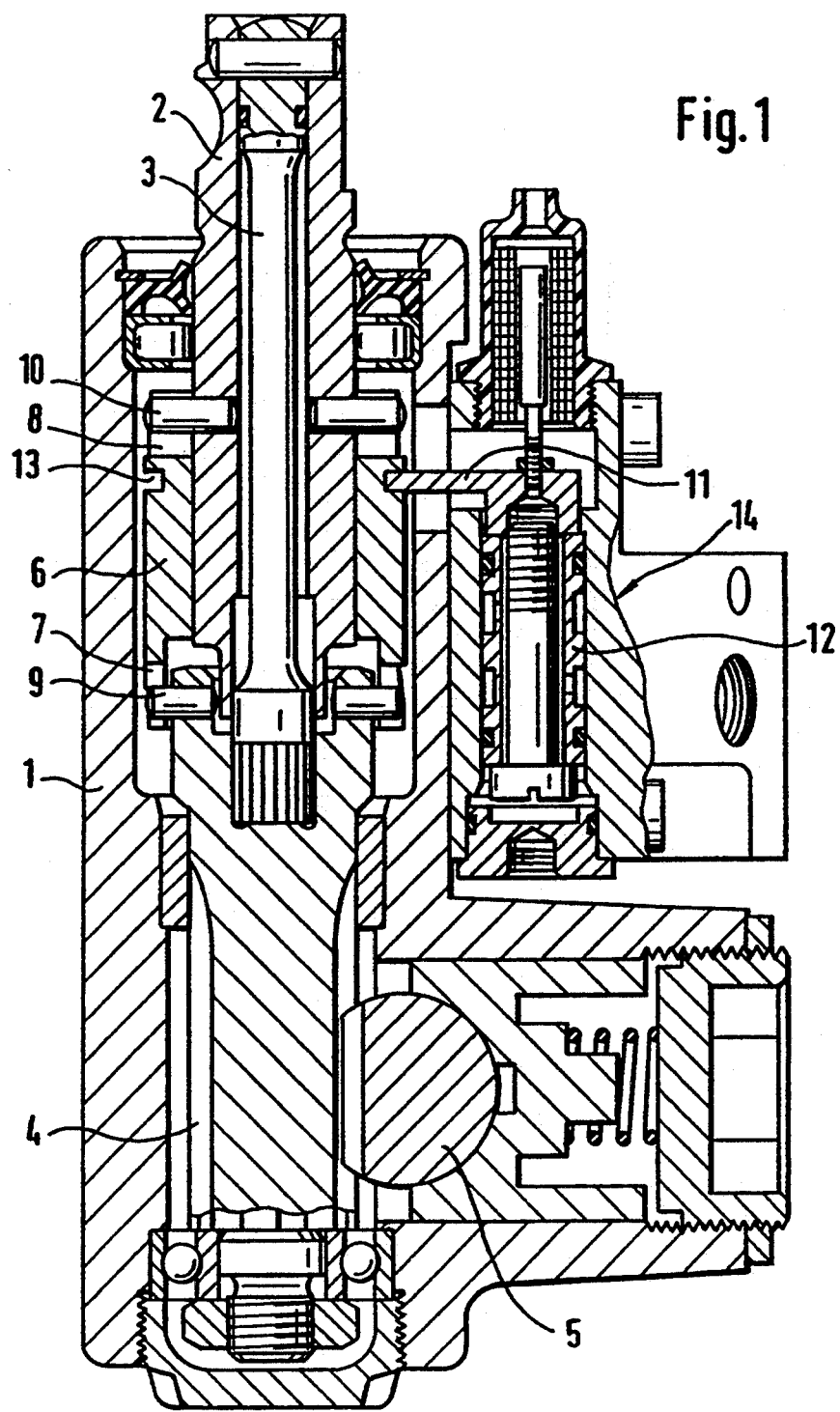
FIG. 1 is a cross-section taken through a steering gear with a control valve slide directly engaging into the sleeve according to the invention.

Like component parts have been assigned like reference numerals in all Figures. Only those details important for understanding the operation of the present invention have been included in the Figures.

The steering shaft 2 which is coupled to a non-illustrated steering wheel can be seen in the housing 1 of the steering gear in FIG. 1. Once a rotary motion is introduced via the steering shaft 2, the torsion rod 3 twists in response to the torque and transmits the steering torque of the driver onto the pinion shaft 4. The pinion shaft 4 meshes with the gear rack 5 which, via a non-illustrated track rod and steering levers, effects the steering maneuver of the wheels.

Figure 2:
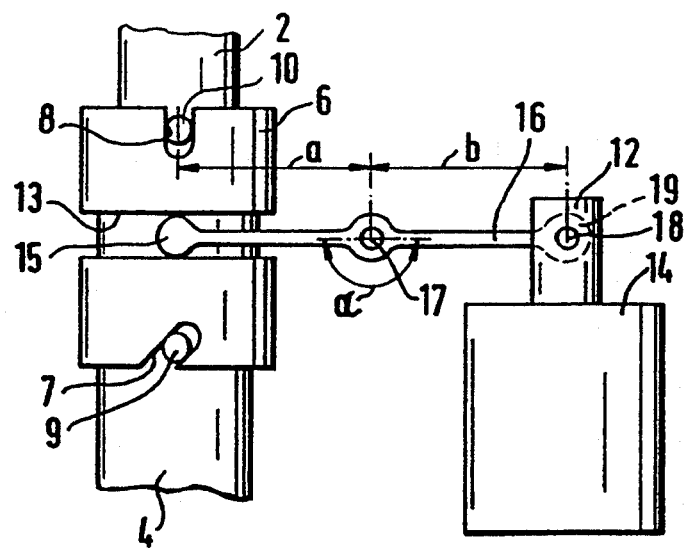
FIG. 2 shows symbolically a steering shaft and a pinion shaft with a sleeve as well as a control valve articulated through a double lever.

The relative movement in a circumferential direction between pinion shaft 4 and steering shaft 2 is converted by the sleeve 6 into a linear movement in the axial direction. This is accomplished by two helically extending coulisse-type guides 7 at the end of the sleeve 6 and, respectively, by two axially extending coulisse-type guides 8 at the other end of the sleeve 6 in coaction with the pins 9 and 10, respectively, in the pinion shaft 4 and in the steering shaft 2. The coulisse-type guides 7 and 8 are shaped as elongated holes. As shown in FIG. 2, the helically extending coulisse-type guides 7 extend in an axial direction and also in circumferential direction at an angle of roughly 45° relative to the longitudinal axes of the shafts. Axially extending coulisse-type guides 8 extend in a direction along the longitudinal axes of the shafts. The guides are straight in themselves, and act by means of the pins 9 between the sleeve 6 and the pinion shaft 4. The axially extending coulisse-type guides 8 take effect by means of the pins 10 between the sleeve 6 and the steering shaft 2. The linear movement is transmitted directly onto the control valve 14 by engagement of the entraining means 11 of the valve slide 12 into the circumferential groove 13 at the periphery of the sleeve 6. The forces acting on the sleeve 6 and, respectively, on the extension 11 and on the pins 9, 10 are solely dependent on the displacing force of the valve slide 12.

FIG. 2 shows another arrangement for transmitting the axial movement of the sleeve 6 onto the valve slide 12. The valve slide 12 is articulated in a manner devoid of transverse forces by means of a double lever 16 which has at one end a fork 15 seizing the sleeve 6 on both sides. The transmission ratio can be varied by the two lever lengths 'a' and 'b'. Distance 'a' is the distance between the point of articulation of the fork 15 and the point of bearing 17 of the double lever 16, and distance 'b' is the distance between the point of bearing 17 and the point of attachment 18 of the other end 19 of the double lever 16 on the valve slide 12. Another possibility of varying the transmission ratio results by variation of the inclination of the helically extending coulisse-type guide 7 in relation to the axial direction. It is furthermore possible to arrange the control valve 14 optionally on the steering housing 1 by variation of the angle α on the point of bearing 17 of the double lever 16.

Figure 3:
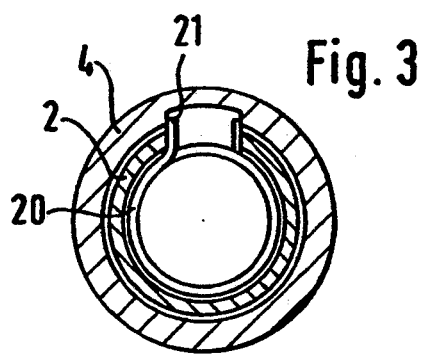
FIG. 3 is a sectional view of the arrangement of the leg spring biassing the pinion shaft.

FIG. 3 shows a cross-section through the steering shaft 2 and the pinion shaft 4. A biassed leg spring 20 takes support in the recess 21 of the pinion shaft 4. Before a relative rotation between pinion shaft 4 and steering shaft 2 is caused by rotation of the steering shaft 2, the biassing force of the leg spring 20 must be overcome. This serves to predetermine a response threshold for the commencement of the steering aid and to also adjust it via the bias.

Figure 4:
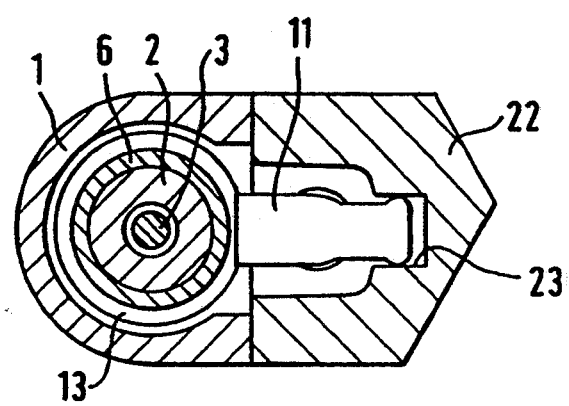
FIG. 4 is a sectional view of the axial guide of the control valve activation.

The axial guiding of the valve slide 12 in the housing 22 of the control valve 14 is shown in cross-section in FIG. 4. The entraining means 11 on the valve slide 12 is extended in a radial direction with respect to the axis of the steering shaft 2 and is guided in an axial groove 23. This measure enables an articulation of the valve slide 12 which is devoid of transverse forces, and rotational movement of the sleeve 6 is prevented from being transmitted via the entraining means 11 onto the control valve 14.

Figure 5:
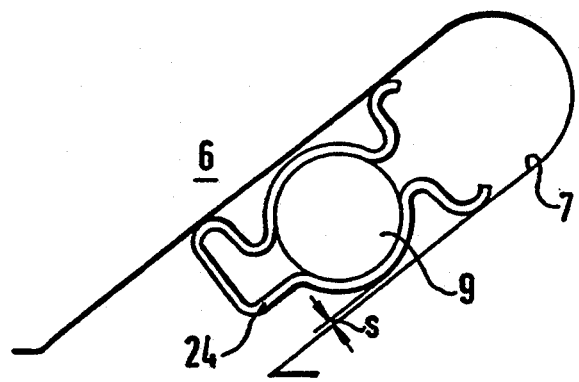
FIG. 5 is an enlarged view of the resilient clamp on the pin in the coulisse-type guide.

FIG. 5 illustrates on a highly enlarged scale the area of the helical coulisse-type guide 7. A resilient clamp 24 is slipped on the pin 9 and is supported at three points on the coulisse-type guide 7 and ensures a very small clearance 's'. This clearance 's' is adjustable in that the pin diameter and coulisse-type guide width are measured and in that resilient clamps 24 of varying wire sizes can be chosen. The hysteresis between steering torque and valve displacement becomes particularly small by minimizing the clearance 's'.

Figure 6:
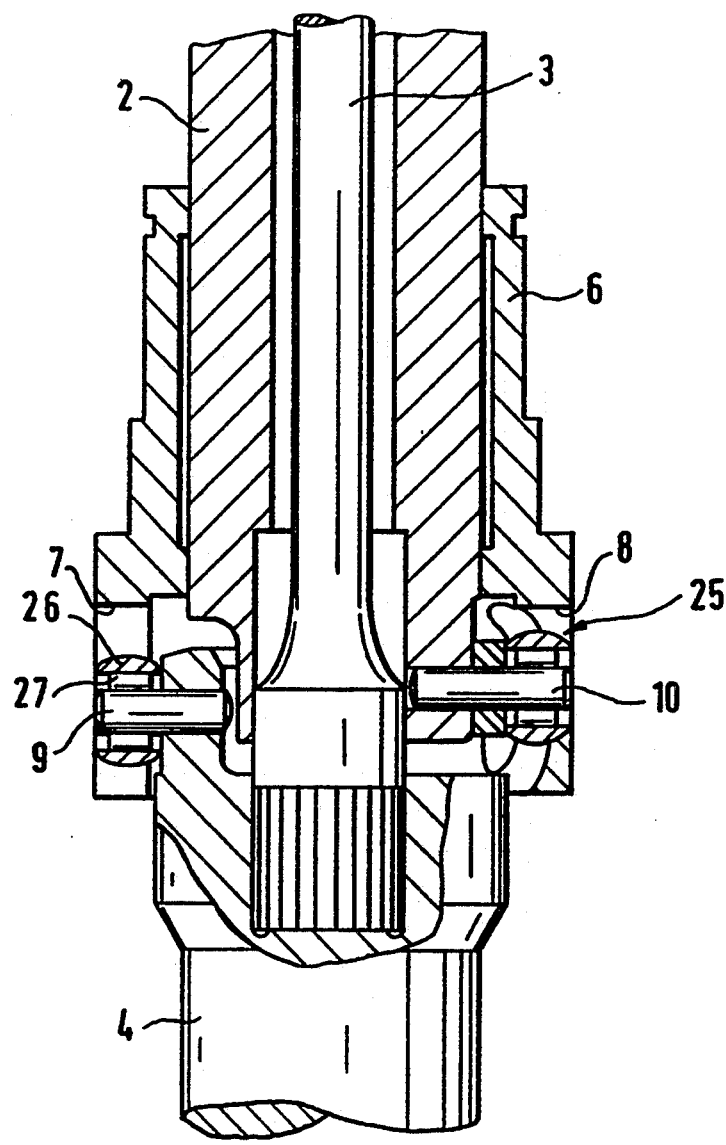
FIG. 6 is a sectional view showing the roller bearing of the pins in the coulisse-type guide.

FIG. 6 shows a cross-section taken through steering shaft 2, pinion shaft 4 and the sleeve 6 with the pins 9, 10 in the coulisse-type guides 7, 8, with the left-hand half of the drawing being drawn in a way turned by 90° in relation to the right-hand half. Both coulisse-type guides 7 and 8 are arranged on one end of the sleeve 6. The entraining means of the valve slide engage the other end—not shown. In order to reduce the friction between the pins 9, 10 and the coulisse-type guides 7, 8, needle bearings 25 are interposed therebetween which are composed of an external ring 26 and an internal ring 27. The spherical design of the external bearing ring 26 compensates for inferior manufacturing tolerances of the coulisse-type guides 7, 8, without the function of the arrangement being impaired.

Figure 7:
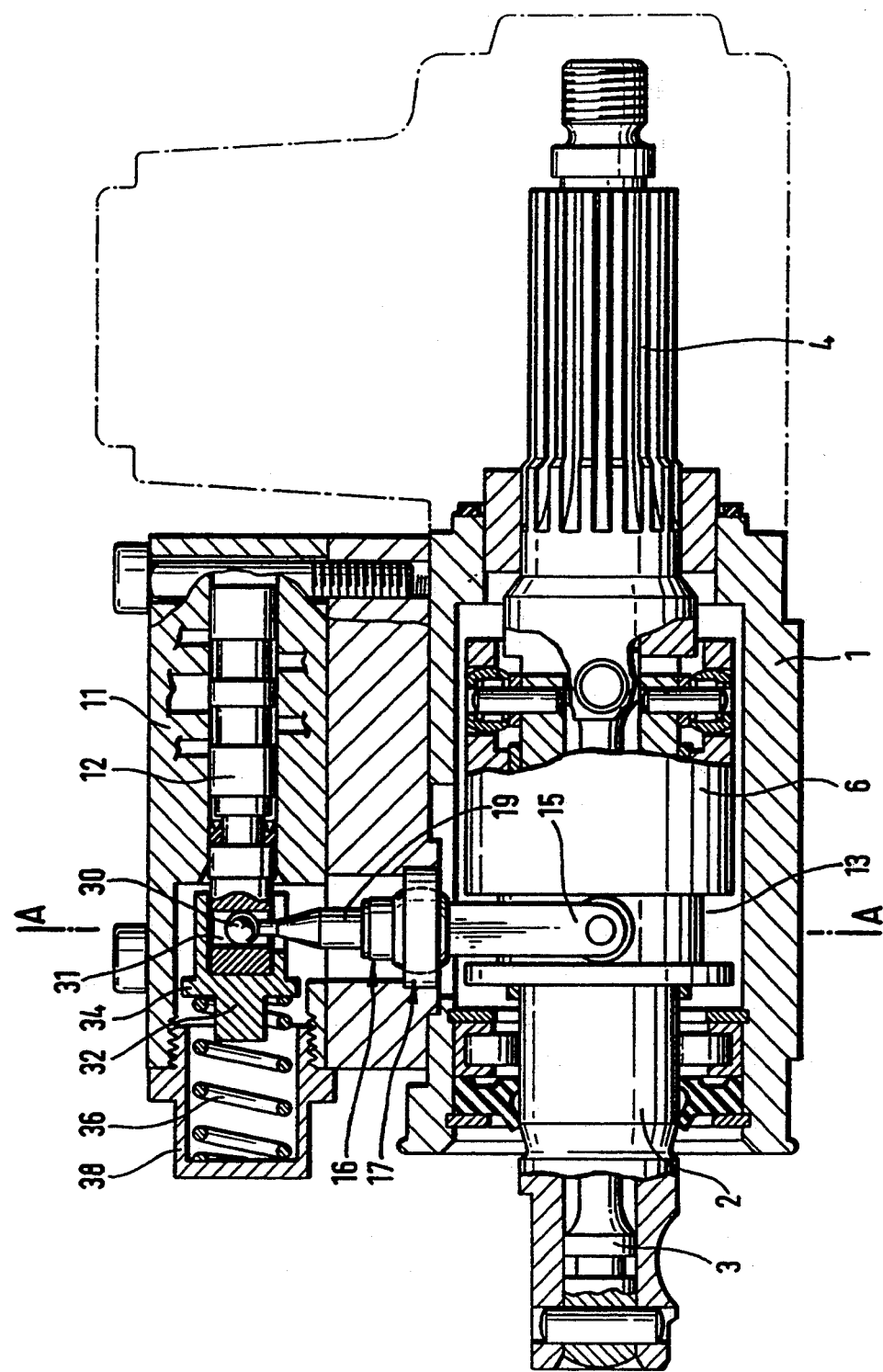
FIG. 7 is a cross-sectional view of a steering gear according to another embodiment of the present invention.

The steering gear shown in FIGS. 7 and 8 corresponds substantially to that one in FIG. 1; therefore, only the differences will be explained in the following.

To transmit the axial movement in the sleeve 6 to the valve slide 12, an arrangement has been explained already by way of FIG. 2. This arrangement includes a double lever designed as a fork on one side, with the fork seizing the sleeve 6 on both sides in order to achieve an articulation to the valve slide 12 which is devoid of transverse forces to the largest possible extent. This articulation is realized also in the embodiment according to FIGS. 7 and 8. The double lever 16 comprises two arms 15, 19 extending from a spherical joint 17 in opposite directions. One of these arms 15 is of U-shaped design and is provided with slide elements 28, 29 at its end for engaging sleeve 6. Arm 15 is secured by means of pins into a guide disposed on the sleeve 6, with the connecting line of the two points of application of the fork intersecting the center line of the sleeve 6. The guide is formed by a circumferential groove 13 which extends transversely to the longitudinal axis of the sleeve. The other arm 19 of the double lever 16 comprises at its end a ball element 30 which engages a guide 31 of the valve slide 12 extending transversely to the longitudinal axis of the valve slide.

The valve slide 12 is axially slidably supported in a bore of a valve housing. Extending transversely to this bore are further bores to which, via corresponding connections (not shown), lines are connected which lead to a piston-and-cylinder assembly (also not shown).

A sleeve 32 is mounted on the end of the valve slide 12 which extends over the end portion of the valve slide 12 up to and beyond the area of articulation for the lever 16. The sleeve 32 forms a radially extending flange-type portion 34 on which a helical spring 36 is abutting, the other end of which takes support on a caplike closing means 38 of the valve housing. This spring 36 serves to compensate for all actuating clearances of the valve, lever and sleeve activation which results in a considerable reduction in hysteresis. In addition to this, this arrangement permits making the clearances and tolerances larger in size, whereby a cost reduction is accomplished. The spring force of the helical spring 36 must exceed the valve displacement force in order to be able to ensure a clearance compensation.

In the event of rupture of the lever 16, the valve slide 12 is displaced by the spring 36 to assume a hydraulic shunt position where the two cylinder chambers of the piston-and-cylinder assembly are interconnected to permit a normal steering function without the aid of power steering. As a result, hydraulic locking of the steering cylinder is no longer possible.

List of Reference Numerals 1 housing
2 steering shaft
3 torsion rod
4 pinion shaft
5 gear rack
6 sleeve
7 coulisse-type guide, helical
8 coulisse-type guide, axial
9 pin
10 pin
11 entraining means
12 valve slide
13 circumferential groove
14 control valve
15 fork of one end, arm
16 double lever
17 point of bearing, spherical joint
18 point of attachment
19 other end, other arm
20 leg spring
21 recess
22 housing of the control valve
23 axial groove
24 resilient clamp
25 needle bearing
26 external ring
27 internal ring
28 slide element
29 slide element
30 ball element
31 guide
32 sleeve
34 flange-like portion
36 helical spring
38 closure element
a lever length, distance
b lever length, distance
s clearance
Á angle of the double lever

What is claimed:

1. Apparatus for actuating a linear slide control valve of a hydraulic power steering system in response to rotation of a steering wheel of an automotive vehicle, said apparatus comprising:
   a pinion shaft having a longitudinal axis;
   a steering shaft having a longitudinal axis aligned with said longitudinal axis of said pinion shaft and adapted to be coupled to a steering wheel of an automotive vehicle, said steering shaft mounted for rotation about its longitudinal axis relative to said pinion shaft in response to rotation of said steering wheel;
   a sleeve having a longitudinal axis aligned with said longitudinal axes of said pinion shaft and said steering shaft and extending over a portion of said steering shaft and a portion of said pinion shaft;
   means extending between said steering shaft and said sleeve and between said pinion shaft and said sleeve for converting relative rotational movement between said steering shaft and said pinion shaft into (a) rotational movement of said sleeve about said longitudinal axis of said sleeve, and (b) linear displacement of said sleeve along said longitudinal axis of said sleeve; and
   means connected at a first end to said sleeve and adapted to be connected at a second end to a linear slide control valve of a hydraulic power steering system for transmitting linear displacement of said sleeve to said linear slide control valve.

2. Apparatus as claimed in claim 1 wherein said converting means include:
   (a) a first guide at a first end of said sleeve extending along a first axis,
   (b) a second guide at a second end of said sleeve extending along a second axis disposed at an angle to said first axis,
   (c) a first pin attached to said steering shaft and engaging said first guide, and
   (d) a second pin attached to said pinion shaft and engaging said second guide.

3. Apparatus as claimed in claim 1 wherein said converting means include:
   (a) a first pair of guides at a first end of said sleeve extending along said longitudinal axis of said sleeve,
   (b) a second pair of guides at a second end of said sleeve extending helically of said sleeve,
   (c) a first pair of pins attached to said steering shaft and individually engaging one of said guides of said first pair of guides, and
   (d) a second pair of pins attached to said pinion shaft and individually engaging one of said second pair of guides.

4. Apparatus as claimed in claim 1 wherein said converting means include:

(a) a first guide in said sleeve extending along a first axis, (b) a second guide in said sleeve diametrically opposed to said first guide and extending along a second axis disposed at an angle to said first axis, (c) a first pin attached to said steering shaft and engaging said first guide, and (d) a second pin attached to said pinion shaft and engaging said second guide.

5. Apparatus as claimed in claim 1 wherein said sleeve includes a circumferential groove and said transmitting means include a double lever having a forked end which engages said circumferential groove and a second end adapted to be connected to said linear slide control valve.

6. Apparatus as claimed in claim 5 further including means for guiding movement of transmitting means along said longitudinal axes.

7. Apparatus as claimed in claim 5 further including a ball element at the end of said double lever which engages said linear control valve and a guide extending transversely to the longitudinal axis of said linear slide control valve and by which said ball element is received.

8. Apparatus as claimed in claim 5 wherein said double lever includes a spherical joint, a first arm extending from said spherical joint to said sleeve, and a second arm extending from said spherical joint to said linear slide control valve.

9. Hydraulic power steering apparatus for an automotive vehicle, said apparatus comprising:

a pinion shaft having a longitudinal axis;

a steering shaft having a longitudinal axis aligned with said longitudinal axis of said pinion shaft and adapted to be coupled to a steering wheel of an automotive vehicle, said steering shaft mounted for rotation about its longitudinal axis relative to said pinion shaft in response to rotation of said steering wheel;

a sleeve having a longitudinal axis aligned with said longitudinal axes of said pinion shaft and said steering shaft and extending over a portion of said steering shaft and over a portion of said pinion shaft;

means extending between said steering shaft and said sleeve and between said pinion shaft and said sleeve for converting relative rotational movement between said steering shaft and said pinion shaft into (a) rotational movement of said sleeve about said longitudinal axis of said sleeve, and (b) linear displacement of said sleeve along said longitudinal axis of said sleeve;

a linear slide control valve having a valve slide; and means extending between said sleeve and said slide valve for transmitting linear displacement of said sleeve to said valve slide.

10. Apparatus as claimed in claim 9 wherein said sleeve includes a circumferential groove and said transmitting means include a double lever having a forked end which engages said circumferential groove and a second end adapted connected to said valve slide.

11. Apparatus as claimed in claim 10 wherein said double lever is mounted for pivotal movement by a spherical bearing.

12. Apparatus as claimed in claim 10 further including a spring extending between said steering shaft and said pinion shaft for restricting relative rotation between said steering shaft and said pinion shaft until the spring force of said spring is exceeded by the torque imparted to said steering shaft from rotational movement of said steering wheel.

13. Apparatus as claimed in claim 9, wherein:

said converting means include:

(a) a first guide at a first end of said sleeve extending along a first axis, (b) a second guide at a second end of said sleeve extending along a second axis disposed at an angle to said first axis, (c) a first pin attached to said steering shaft and engaging said first guide, and (d) a second pin attached to said pinion shaft and engaging said second guide; and said apparatus further includes a plurality of resilient clamps, individually associated with each of said first and second pins, fitted within one of said first and second guides and through which one of said pins extend.

14. Apparatus as claimed in claim 10 wherein:

said converting means include:

(a) a first guide at a first end of said sleeve extending along a first axis, (b) a second guide at a second end of said sleeve extending along a second axis disposed at an angle to said first axis, (c) a first pin attached to said steering shaft and engaging said first guide, and (d) a second pin attached to said pinion shaft and engaging said second guide;

said first pin has a needle bearing which engages said first guide for reducing the friction between said first pin and said first guide; and said second pin has a needle bearing which engages said second guide for reducing the friction between said second pin and said second guide.

15. Apparatus as claimed in claim 14 wherein each said needle bearing includes an external bearing ring which engages an associated one of said guides and is of spherical shape.

16. Apparatus as claimed in claim 9 further including a housing within which said linear slide control valve is positioned and wherein said sleeve includes a circumferential groove and said transmitting means include a double lever pivotally mounted in said housing and having a forked end which engages said circumferential groove.

17. Apparatus as claimed in claim 16 further including a spring located within said linear slide control valve housing for applying a bias on said valve slide.

18. Apparatus as claimed in claim 17 further including a sleeve-shaped part attached to said valve slide and surrounding an end portion of said valve slide for supporting said spring at a first side of said valve slide.

19. Apparatus as claimed in claim 18 wherein said linear slide control valve housing has a bore and includes a closure element which closes said bore and supports said spring at a second side of said valve slide opposite from said first side of said valve slide.

* * * * *

UNITED STATES PATENT AND TRADEMARK OFFICE
CERTIFICATE OF CORRECTION

PATENT NO.   : 5,348,110
DATED        : September 20, 1994
INVENTOR(S)  : Klein et al.

It is certified that error appears in the above-identified patent and that said Letters Patent is hereby corrected as shown below:

In claim 13, column 8, line 8, delete the number "9" and substitute therefore --10--

Signed and Sealed this

Twenty-seventh Day of December, 1994

Attest:

BRUCE LEHMAN

Attesting Officer

Commissioner of Patents and Trademarks